United States Patent
Liu et al.

(10) Patent No.: US 10,409,854 B2
(45) Date of Patent: Sep. 10, 2019

(54) IMAGE SELECTION BASED ON TEXT TOPIC AND IMAGE EXPLANATORY VALUE

(71) Applicant: Hewlett-Packard Development Company, L.P., Spring, TX (US)

(72) Inventors: Lei Liu, Palo Alto, CA (US); Jerry Liu, Palo Alto, CA (US); Shanchan Wu, Palo Alto, CA (US); Hector A Lopez, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/545,812

(22) PCT Filed: Mar. 26, 2015

(86) PCT No.: PCT/US2015/022617
§ 371 (c)(1),
(2) Date: Jul. 24, 2017

(87) PCT Pub. No.: WO2016/153510
PCT Pub. Date: Sep. 29, 2016

(65) Prior Publication Data
US 2018/0018349 A1  Jan. 18, 2018

(51) Int. Cl.
*G06K 9/00* (2006.01)
*G06F 16/583* (2019.01)
*G06F 16/951* (2019.01)
*G06F 17/27* (2006.01)
*G06F 17/21* (2006.01)
*G06F 17/24* (2006.01)

(52) U.S. Cl.
CPC ........ *G06F 16/5838* (2019.01); *G06F 16/951* (2019.01); *G06F 17/218* (2013.01); *G06F 17/241* (2013.01); *G06F 17/2785* (2013.01); *G06K 9/00456* (2013.01)

(58) Field of Classification Search
CPC .. G06F 17/218; G06F 17/241; G06F 17/2785; G06F 17/30256; G06F 17/30864; G06K 9/00456
See application file for complete search history.

(56) References Cited

U.S. PATENT DOCUMENTS

| 6,021,412 A | 2/2000 | Ho et al. |
| 6,157,392 A | 12/2000 | McKeeth |
| 6,904,560 B1 | 6/2005 | Panda |

(Continued)

FOREIGN PATENT DOCUMENTS

WO  WO-2012-002551 A1  1/2012

OTHER PUBLICATIONS

Heller, K.A, et al, "A Simple Bayesian Framework for Content-Based Image Retrieval", 2006.

*Primary Examiner* — Amara Abdi
(74) *Attorney, Agent, or Firm* — HP Inc. Patent Department

(57) ABSTRACT

Examples disclosed herein relate to selecting an image based on text topic and image explanatory value. In one implementation, a processor selects an image to associate with a text based on a criteria indicating the explanatory value of a context information related to the image in relation to the topic of the text. The processor may output the selected image.

14 Claims, 5 Drawing Sheets

(56) References Cited

U.S. PATENT DOCUMENTS

| | | | |
|---|---|---|---|
| 7,051,019 B1 | 5/2006 | Land et al. | |
| 9,075,812 B1* | 7/2015 | Heyward | G06F 16/156 |
| 2002/0077848 A1 | 6/2002 | Campbell | |
| 2006/0080306 A1* | 4/2006 | Land | G06F 16/58 |
| 2008/0320384 A1* | 12/2008 | Nagarajan | G06F 16/58 |
| | | | 715/255 |
| 2013/0007057 A1 | 1/2013 | Li et al. | |
| 2014/0075296 A1* | 3/2014 | Schaad | G06F 17/2229 |
| | | | 715/243 |
| 2016/0063993 A1* | 3/2016 | Dolan | G06F 16/00 |
| | | | 704/254 |

* cited by examiner

IMAGE SELECTION BASED ON TEXT TOPIC AND IMAGE EXPLANATORY VALUE

BACKGROUND

A publication may include both images and text. The images may draw a reader's attention and make the publication more visually appealing. As an example, a textbook may include both images and text.

BRIEF DESCRIPTION OF THE DRAWINGS

The drawings describe example embodiments. The following detailed description references the drawings, wherein.

DETAILED DESCRIPTION

Illustrations may add to the educational value of text. In one implementation, a processor selects an image to associate with a text based on a criteria indicating the explanatory value of the image in relation to the text. For example, a processor may determine a topic related to the text and select an image based on context information related to the image compared to the topic of the text. The text topic may be a semantic topic with associated words, phrases, and/or concepts. The processor may determine the topic based on an analysis of the text in its entirety or selected portions of the text. For example, a processor may analyze a non-summarized version of the text to determine the text topic. In one implementation, a portion of text is determined to be associated with multiple topics. The flexibility of longer search streams and multiple topics may allow a more relevant image with greater explanatory value to be selected. In one implementation, the processor selects and/or receives a set of images relevant to the text. The processor may select in image within the set of images according to its explanatory value compared to the text topic.

In one implementation, a processor determines multiple topics related to a text, and divides the text based on topic. For example, adjacent portions of the text with similar topics may be grouped together and separated from an adjacent portion with a different topic. The processor may associate an illustration with each portion such that the illustration is intended to add explanatory information to the portion of text. For example, images may be added to text meant for learning material, such as a training manual or textbook.

In one implementation, the image selection is part of an automated publishing tool. For example, a processor may cause a user interface to be displayed to allow a user to create a custom publication such that images are automatically suggested and/or selected. For example, a software product may allow images to be added to professional or amateur publications.

Figure 1:
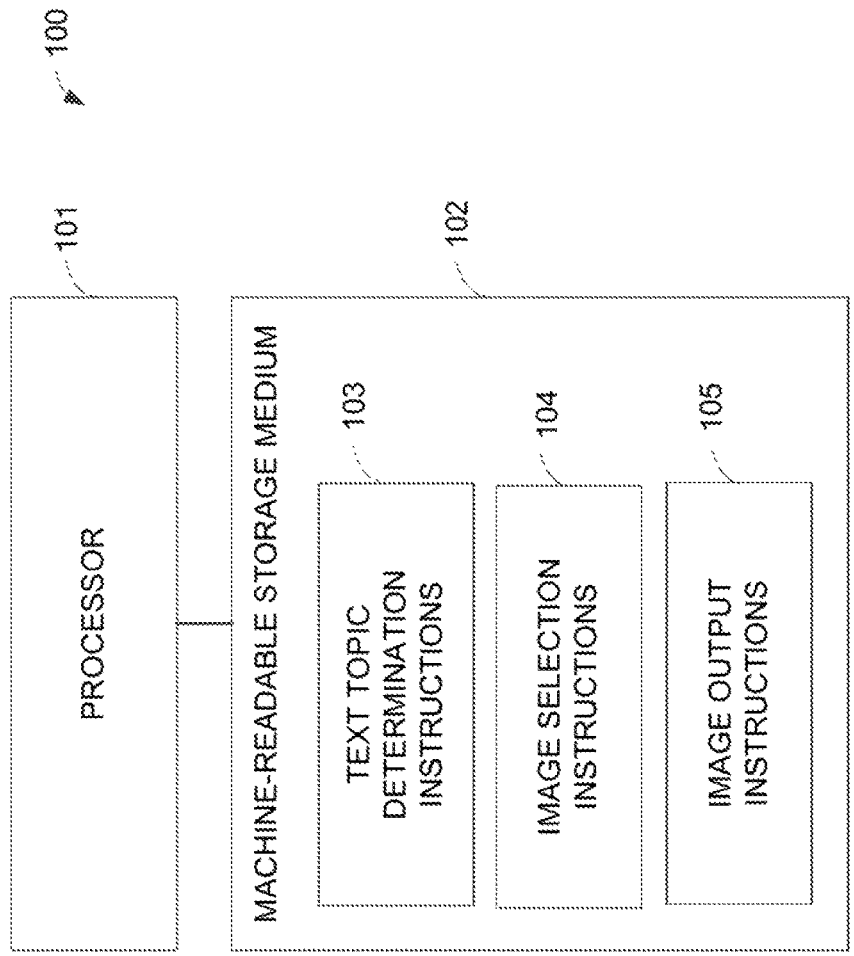
FIG. 1 is a block diagram illustrating one example of a computing system to select an image based on text topic and image explanatory value.

FIG. 1 is a block diagram illustrating one example of a computing system to, select an image based on text topic and image explanatory value. For example, a text topic may be determined, and an image may be selected from a set of images based on the image explanatory value compared to the text topic. The computing system 100 includes a processor 101 and a machine-readable storage medium 102.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include text topic determination instructions 103, image selection instructions 104, and image output instructions 105.

The text topic determination instructions 103 may include instructions to determine a topic associated with a text. The text may be any suitable text, such as a text associated with a text book or web page. The topic may be determined in any suitable manner. In one implementation, a topic model is applied to the text. The topic may be determined and associated with a list of keywords and concepts associated with the topic. For example, the topic may be a semantic concept with associated words and concepts that are determined to frequently appear in text of the particular semantic topic. The topic model of associated topics and keywords and concepts may be created by the processor 101 or another processor. The processor 101 may access information related to the topic model from a storage, and apply the topic model to the text.

The image selection instructions 104 include instructions to select an image within a set of images based on a level of explanatory value of content associated with the image compared to the determined topic. The processor may analyze context information associated with the image, such as text associated with the image. For example, the processor may analyze text included in a document, such as a webpage, that contains the image. In some cases, the image may include both text and graphical elements, and the textual information may be analyzed and compared to the topic of the input text. In one implementation, the processor accesses a storage including a set of images and text associated with each of the images, such as textual tags associated with each of the images. An image may be selected based on an explanatory value associated with the image as compared to the topic. For example, the images may be ranked based on their level of explanatory value compared to the text topic, and a top N images may be selected. In one implementation, a user interface allows a user to provide input related to a set of ranked images.

The image output instructions 105 include instructions to output information related to the selected image. For example, the processor may store, transmit, or display information related to the selected image. In one implementation, the selected image is associated with the text for a publication, such as a print or digital publication, and the processor causes the publication to be stored, printed, transmitted, and/or displayed. For example, the processor may select images to be associated with different portions of the publication.

In one implementation, the image output instructions 105 include instructions to output information related to a set of images, such as a set of images with the N highest ranking for explanatory value compared to the topic, to a user interface. The user interface may be used to allow a user to provide user input to select one of the suggested images. For example, the user interface may be part of an automated publishing software user interface to allow a user to create a custom publication.

Figure 2:
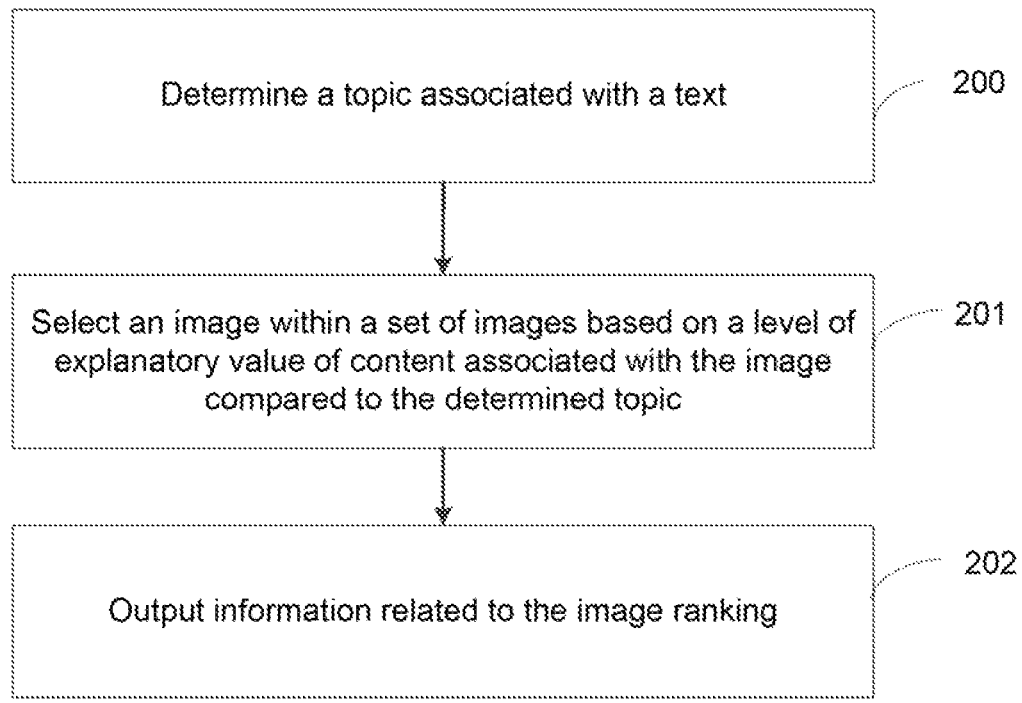
FIG. 2 is a flow chart illustrating one example of a method to select an image based on text topic and image explanatory value.

FIG. 2 is a flow chart illustrating one example of a method to select an image based on text topic and image explanatory value. A processor may automatically suggest an image to be associated with a text based on the ability of the image to provide additional learning information to compliment the text. For example, the processor may determine a topic associated with the text and compare the topic to context information associated with the image, such as text included within a document containing the image. The processor may determine an explanatory value of an image related to the text topic and select the image from a set of images based on the relative explanatory value. The method may be implemented, for example, by the computing system 100 of FIG. 1.

Beginning at 200, a processor determines a topic associated with a text. The topic may be determined in any suitable manner. For example, the processor may compare the text to a topic model. The processor may apply the topic model to the whole or subset of the text, such as applying to an abstract and title or the body of the text.

In one implementation a processor creates a topic model, such as a topic model based on the probabilistic occurrence of terms in a text related to a particular topic. For example, a Probabilistic Latent Indexing method or a Latent Dirichlet Allocation (LDA) method may be used. The processor may cause the LDA method to be implemented in the following manner to create the topic model:

$$p(\beta_{1:K}, \theta_{1:D}, Z_{1:D}, W_{1:D}) = \Pi_{i=1}^{K} p(\beta_i) \Pi_{d=1}^{D} p(\theta_d)$$
$$(\Pi_{n=1}^{N} p(Z_{d,n}|\theta_d) p(W_{d,n}|\beta_{1:K}, Z_{d,n}))$$

where $\beta_{1:K}$ is the topics and each $\beta_k$ is a distribution over the vocabulary. The topic proportions of the d-th document are $\theta_d$ where $\theta_{d,k}$ is the topic proportion for the topic k in document d. The topic assignments for the d-th document are $z_d$ where $z_{d,n}$ is the topic assignment for the n-th word in document d. The observed words for the document d are $w_d$ where $w_{d,n}$ is the nth word in document d. The processor may simplify the topic model. For example, the processor may detect topics in the query content and extract a subset of words, such as five words, with highest probability score $\beta_k$ to represent the topic.

The processor or a different processor may access stored information related to the created topic model to associate the text with a topic. Each topic may have an associated set of terms, and a query created from the text may be compared to the terms likely to appear in the topic. The processor may create a query based on the entire or a portion of the text. In one implementation, there is a probability associated with the occurrence or number of occurrences of the term in a query associated with the topic. The query terms may be compared to the terms associated with different topics, and the probability of the query be associated with different potential topics may be determined. The text may be associated with a semantic topic and concepts based on the topic model such that the text is associated with keywords associated with the topic not contained within the text.

In one implementation, the processor divides the text into sections based on topics. For example, the processor may cluster portions based on similar topics. Adjacent portions with similar topics may be combined. The sections may be divided such that different images are related to the different sets. In one implementation, a set of topics is determined where each topic is associated with a portion, and the processor then selects an image for each portion based on the associated topic.

Continuing to 201, the processor selects an image within a set of images based on a level of explanatory value of content associated with the image compared to the determined topic. The explanatory value of an image compared to the topic may be determined based on text associated with the image. For example, an image file may include both pictures, such as a pictorial flow chart with associated text explanations. The processor may analyze the text within the image file and surrounding the image, such as text on a webpage that contains the image. The associated image content text may be analyzed to determine its explanatory value relative to the determined topic.

In one implementation, the processor performs preprocessing prior to determining the explanatory value of a set of images. For example, the processor may select a set of images relevant to the text topic to evaluate for level of explanatory value. The processor may create a search query based on the topic and associated keywords and phrases and apply the query to a search engine, such as a commercially available search engine. The processor may determine the level of explanatory value for a subset of images determined to be relevant to the text topic. For example, there may be a set of three images, two of which are relevant to a chemistry text topic and one related to oceanography. The processor may select the two images related to chemistry and determine levels of explanatory value for each. The processor may select one of the two images based on a comparison of their levels of explanatory value.

The level of explanatory value may be determined in any suitable manner. In one implementation, a query is created based on the text topic, and images are selected based on the query. The query may be created as a question, and the level of explanatory value may be automatically determined based on question/answer methods such that the level of explanatory value is determined based on the ability of the image to answer the question. For example, the content text associated with the image may be used to determine the ability to answer the question. The processor may access stored information related to a template for formatting a question based on a set of keywords related to the topic. The processor may then receive a set of candidate answers, such as by using a search engine. The set of candidate answers may be text associated with images, and the processor may evaluate the explanatory value of the images according to the correctness of the answers. For example the processor may use a supervised multi-stream approach to determine the correctness of the answers based on a set of features that describe the compatibility between the question and the answer types, the redundancy of answers across streams, and the overlap and non-overlap information between the question-answer pair and the support text. The processor may build or access a classifier using the multi-stream approach to evaluate candidate answers and assign them to a correct or incorrect category with a confidence level. An image may be selected based on being in the category including the correct answers and based on the confidence level.

In one implementation, the explanatory value of the image is based on knowledge related phrases in the text associated with the image. For example, the processor may access a storage including a list of knowledge phrases. The knowledge phrases may be specific to a topic or category of topics. There may be weights associated with the knowledge phrases such that some knowledge phrases are considered more explanatory than others. In one implementation, the processor determines the level of explanatory value based on the number and weight of the knowledge phrases. The processor may determine the level of explanatory value based on context information associated with the knowledge phrases, such as their location within the text and/or other information nearby the knowledge phrase. For example, a knowledge phrase in a heading or in a paragraph with many of the terms associated with the topic may result in a higher level of explanatory value.

A processor may identify knowledge phrases by extracting a list of words and/or phrases that serve as candidate knowledge phrases based on a set of heuristics and determine which of the candidate phrases are correctly identified as knowledge phrases using a supervised or unsupervised method. The heuristics for identifying candidates may include, for example, using a stop word list to remove stop words, allowing words with certain part of speech tags, allowing n-grams that appear in candidates, and extracting n-grams or part of speech phrases (such as nouns) that satisfy pre-defined lexicographical or syntactical patterns. A supervised approach for determining the correctness of knowledge phrase identification may include training a binary classifier based on documents with annotated knowledge phrases. An unsupervised approach for determining the correctness of knowledge phrase identification may include automatically determining the importance of a candidate, such as based on how it is related to other candidates.

In one implementation, the explanatory value of the image is determined based on a topic associated with the content containing/associated with the image. In one implementation, the processor creates a topic based query for evaluating images. For example, a set of terms may be associated with the topic, and the processor may determine the occurrence of the terms in a document containing the image similar to that of determining the topic of, the original text. For example, a topic based model may be applied to the content associated with the image, and the processor may compare the results to the results of applying the topic based model to the original text.

The processor may filter the list of potential images. For example, the processor may filter based on learning difficulty associated with the image, display characteristics (such as image resolution), or permissions settings. The permissions settings may be, for example, public domain, attribute label, share alike, non-commercial, and non-derived. In one implementation, the processor filters based on stored preferences. For example, a user may provide image resolution preference information to a user interface, and the preference information may be stored to be accessed by the processor. In one implementation, the filtering criteria is determined automatically based on a comparison to the text, such as the size of an image to be placed in a custom publication. The processor may disregard images not meeting particular factors or weight the factors in addition to the explanatory value of an image to, select an image.

The processor may select the image in any suitable manner. The processor may provide an explanatory level score or category for each image and/or rank the images relative to one another based on explanatory value. In one implementation, the images are ranked, and the top N images are selected. For example, the top 3 images may be selected, and information about the selected images may be displayed to a user, such as where an icon shows that there is a set of images available to associate with the text. For example, the icon may appear when an image with an explanatory value over a threshold is identified, and the user interface may allow a user to select from a subset of images that were selected based on their explanatory value. In one implementation, the processor selects the image with the highest explanatory value level.

Continuing to 202, the processor outputs information related to the image selection. For example, the processor may display, transmit, or store information related to a selected image. In one implementation, the processor stores information about the image and the associated text. The processor may store the information such that a print and/or digital publication may be created with the selected image appearing next to the selected text. For example, the selection may be part of automated publishing software where the pages of the publication are laid out according to the division in text topics, the number of images, and the size of the images. Aesthetic image and text layout methods may be applied.

The number of images selected to associate with a piece of text may be based on user input. In one implementation, the processor selects the number of images based on a method to differentiate the number, such as a random number generator between 0 and n, where n is the number of images ranked or a ceiling for the number of images to select for a piece of content. In one implementation, there may be a total number of images to associate with a publication, and the number to associate with each topic portion may vary such that the total number of images meets the criteria.

Figure 3:
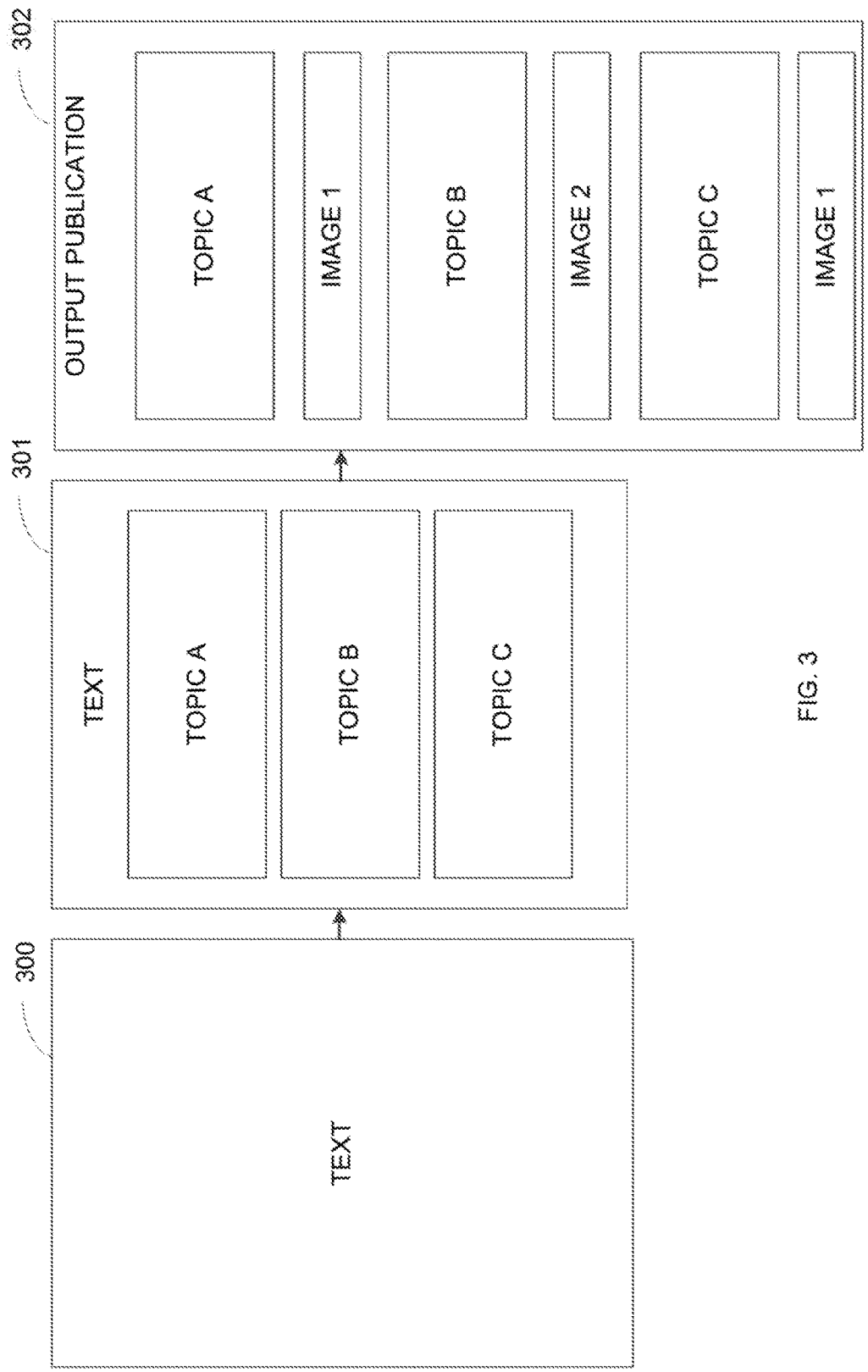
FIG. 3 is a flow chart diagram illustrating one example of automatically associating images with text based on text topic.

FIG. 3 is a flow chart diagram illustrating one example of automatically associating images with text based on text topic. For example, a processor may access a text and automatically associate images with the text based on the explanatory value of the images compared to the topic of the text.

For example, text 300 is automatically divided into portions based on topics. At 301, the text is shown divided into topic A, topic B, and topic C. In one implementation, topics are associated with the portions, and the processor then determines how to compress the topics, such as based on the similarity of topics and/or a setting indicating a desired number of sections. In one implementation, the number of images is provided from user input and the processor compresses the number of topics based on the redundancy and the desired number. For example, where greater number topics are found, multiple images of the same topic may be selected. In cases, where a larger number of topics is found, the processor may compress the topics to the desired number. For example, the word distribution for each topic within the text may be determined, and the processor may remove duplicate or similar topics based on a comparison of the word distribution. A correlation similarity method may be used that compares the similarity of terms between topics.

For example, the processor may use a Pearson correlation method as shown below to determine a correlation between variables X and Y:

$$P_{(x,y)} = \frac{\text{cov}(x, y)}{\sigma_x \sigma_y} = \frac{E[(X - \mu_x)(Y - \mu_y)]}{\sigma_x \sigma_y},$$

where $\mu_x$ and $\mu_y$ are expected values, $\sigma_x$ and $\sigma_y$ are standard deviations, E is the expected value operator, and cov is the covariance.

In one implementation, the topics may be viewed as a probabilistic mix of words, and a Kullback-Leibler method may be used to measure a difference in probability distributions.

At 302, an image is associated with each of the portions, and placed at the end of the portion. For example, image 1 was selected to be associated with topic A based on the explanatory value of image 1 compared to topic A. The images associated with a topic section may be placed in any suitable position, such as the beginning, middle, end, or user defined position. In one implementation, multiple images are associated with a topic, such as where an image is provided for every third page. The image placement may be determined based on stored user preference information and/or automatic layout methods.

Figure 4:
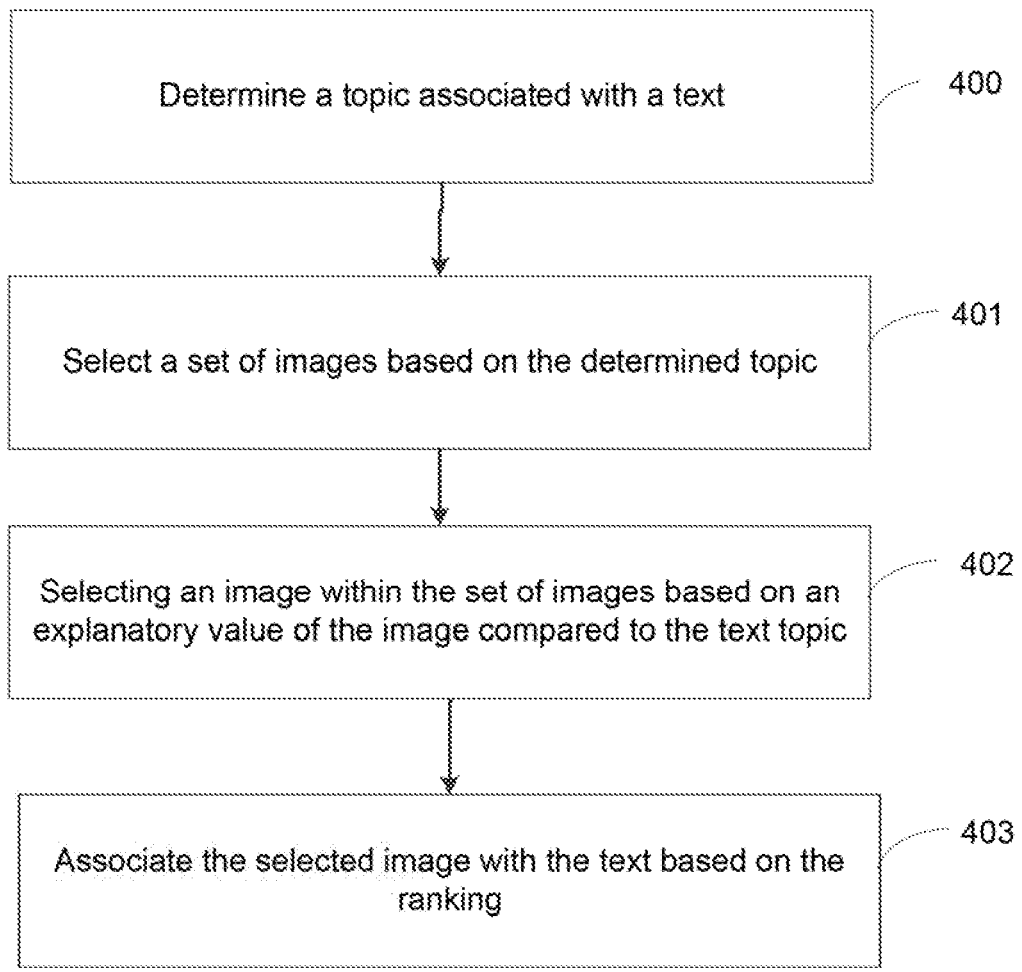
FIG. 4 is a flow chart illustrating one example of a method to select an image to associate with a text based on the text topic and a topic of content information associated with the image.

FIG. 4 is a flow chart illustrating one example of a method to select an image to associate with a text based on the text topic and a topic of content information associated with the image. The processor may determine a topic associated with a text and a topic associated with an image. The topic associated with the image may be determined based on context information associated with the image, such as text in a document that contains the image. For example, a chapter, webpage, or flyer may include an image. The explanatory value of an image compared to a text may be determined based on a comparison of the text topic to the image topic. The processor may select an image to associate with the text based on the explanatory value of the image compared to the text. The method may be implemented, for example, by the computing system 100 of FIG. 1.

Beginning at 400, a processor determines a topic associated with a text. For example, the processor may create or access a topic model including probabilistic information related to the occurrence of words and phrases in a document compared to a particular topic. The terms and the number of times of occurrence in a portion or the entirety of text may be compared to the topic model. The topic may be a semantic topic indicative of a high level concept. In one implementation, the topics are nested, such that the processor determines a topic and subtopic associated with the text.

Continuing to 401, a processor selects a set of images based on the determined topic. In one implementation, the processor creates a query based on the topic. For example, the query may be created based on terms associated with the topic. The terms in the query may include terms in the text and terms not included within the text that are also associated with the topic. The set of images may be selected such that images are relevant to the text topic without regard to the explanatory value of the images in relation to the text topic.

The processor may select a set of images based on any suitable search method for searching images based on a query. In one implementation, the processor uses a search engine, such as a commercially available search engine. The processor may select a set of images based on the results, such as the top N images or the images with relevancy scores above a threshold. The processor may extract and store information related to the selected set of images. For example, in the case of a webpage, the URL, URL content, image content, image size, and image resolution may be extracted and stored for each selected image.

Continuing to 402, a processor selects an image within the set of images based on an explanatory value of the image compared to the text topic. The explanatory value may be related to a comparison of a topic associated with the image and the topic associated with the text. The topic associated with the image may be a topic associated with text in a document including the image. In one implementation, the processor accesses a storage including a set of images and text associated with each of the images, such as textual tags associated with each of the images. The tags may be words and phrases or longer text, and the processor may determine a topic associated with the textual tags. The processor may provide a second analysis of the set of images determined to be relevant to the topic of the text. For example, the pool of images identified to be relevant to the topic based on the first searching step may be ranked based on their explanatory value in relation to the text. For example, a topic model may be applied to text associated with the image, such as to a book, webpage, or other document including the image. The topic of the image may be compared to the topic of the text, The images within the set of images may be ranked or compared based on their topic similarity to the text.

The processor may determine a topic associated with an image in any suitable manner. In one implementation, the topic model for the image is different from the topic model of the original text. The processor may create the topic model based on input text associated with images where treat the context text associated with the image as a query such that the text is a content bucket of words and/or phrases as a bag or words representation. The content associated with the image may be compared to a set of topics where each topic has a set of keywords. The keywords associated with the topic and the, list of topics may be the same topic model for the original text or a different topic model. In one implementation multiple queries are created from the associated content, such as where each paragraph or section with a different heading is a treated as a different query.

The processor may apply a similarity or difference method between the text topic and the image topic. For example, the processor may use cosine similarity, Euclidean distance, RBF kernel. The similarity or difference metric may be used to determine the explanatory value of the image as compared to the text. The images may be ranked such that a subset of the top N images compared to the text are selected or the processor may automatically select the image with the top score. In one implementation, the processor performs additional filtering, such as based on difficulty level, display characteristics, and/or permissions settings associated with the images within the set of images.

Continuing to 403, a processor associates the selected image with the text based on the ranking. For example, the, processor may store, transmit, or display information about the selected image. In one implementation, the processor selects a subset of the images. For example, the processor may select the top N images or the images with similarity scores above a threshold. Information about the subset of images may be provided to a user to select an image from the subset to be associated with the text. In one implementation, the processor automatically creates a publication including the image associated with the text, such as where the image is included adjacent to or nested within the text of the particular topic.

Figure 5:
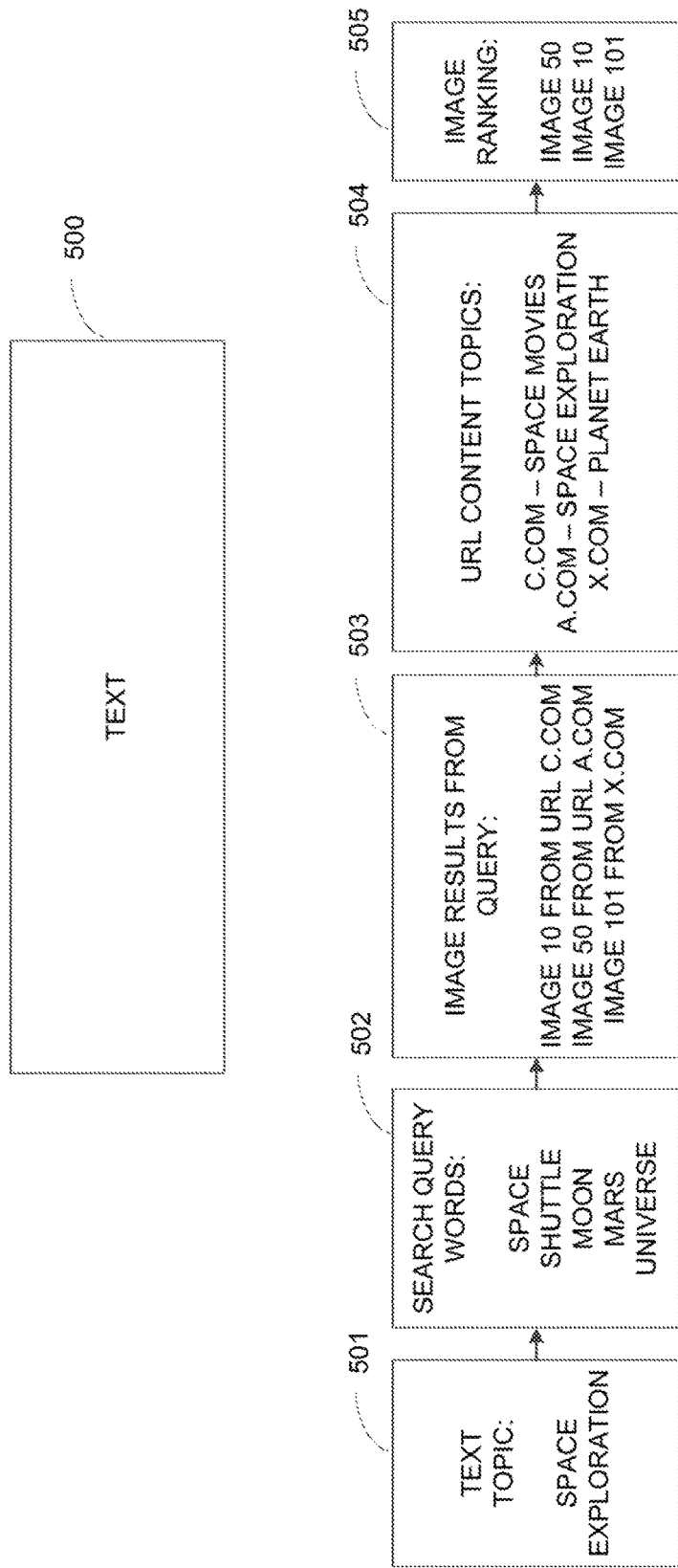
FIG. 5 is a diagram illustrating one example of select an image to associate with a text based on the text topic and a topic of content information associated with the image.

FIG. 5 is a diagram illustrating one example of select an image to associate with a text based on the text topic and a topic of content information associated with the image. A processor may select an image to associate with the text.

Beginning at 501, the processor determines the topic of the text. For example, the topic of text 500 is space exploration. Continuing to 502, the processor creates a search query based on the space exploration topic. For example, the processor may access a storage with keywords associated with different topics. The query may include "space shuttle, moon, mars, universe".

Continuing to 503, the processor receives a list of images and associated webpages. For example, the search returns image 10 from URL c.com. The URL may be stored such that the processor may analyze text on the webpage to determine an explanatory value of the image compared to the space exploration topic.

Continuing to 504, the processor associates a topic with each of the images based on the image context information included at the URL For example, the processor determines a topic associated with text on each of the webpages such that the topic for C.com is space movies. The topics may be determined based on the application of a topic model.

Continuing to 505, the processor ranks the images based on the topic scores associated with their URLs. The images are ranked with Image 50 having the highest explanatory value associated with the text 500. The image 500 may be automatically selected based on the score, or the processor may provide information about the three potential images such that a user may make a selection.

A processor may automatically associate the image 50 with the text 500, such as in a publication. For example, an educator may select text for a student, and explanatory illustrations may be automatically associated with the text. In one implementation, a processor may automatically recommend educational text for a student or class, and the processor may select images to associate with the text. The processor may further create a print or digital publication including the selected text and images. The publication may provide greater educational value due to the type of images associated with the text.

The invention claimed is:

1. A computing system, comprising:
    a processor to:
        determine a topic associated with a set of text;
        generate a query based on the topic, wherein query comprises a question, wherein a set of images is found based on the query, wherein the set of images comprises text associated with a respective image that answers the question;
        select a top N images within the set of images based on a level of explanatory value of content associated with the top N images compared to the topic that is determined, wherein the level of explanatory value of the top N images is above a threshold;
        provide an icon by text associated with the top N images to indicate that the top N images are available for the text, wherein a user interface displays the top N images to allow a user to select an image from the top N images from the user interface; and
        output information related to the image that is selected.

2. The computing system of claim 1, wherein to select the top N images within the set of images based on the level of explanatory value comprises the processor to:
    determine an ability of the top N images to address the question based on the content associated with the top N images; and
    select the top N images based on the ability of the top N images to address the question.

3. The computing system of claim 1, wherein to select the top N images within the set of images based on the level of explanatory value comprises the processor to:
    identify knowledge phrases in the content associated with the top N images; and
    select the top N images based on the knowledge phrases that are identified.

4. The computing system of claim 1, wherein the processor is further to select the set of images based on relevance to the topic.

5. The computing system of claim 1, wherein to select the top N images based on the level of explanatory value comprises the processor to:
    determine a topic of the content associated with the top N images; and
    select the top N images based on a comparison of the topic associated with the set of text that is determined and the topic of the content associated with the top N images that is determined.

6. The computing system of claim 1, wherein to determine the topic associated with the set of text comprises the processor to:
    determine a topic associated with a portion of the set of text; and
    divide the set of text into portions based on a difference in the topic associated with the portions.

7. The computing system of claim 6, wherein to divide the set of text into the portions comprises the processor to combine adjacent portions based on a similarity of topics.

8. A method, comprising:
    determining, by a processor, a topic associated with a text;
    generating a query based on the topic, wherein query comprises a question, wherein a set of images is found based on the query, wherein the set of images comprises text associated with a respective image that answers the question;
    selecting a set of images based on the topic that is determined;
    selecting a top N images within the set of images based on an explanatory value of the top N images compared to the topic associated with the text, wherein the explanatory value is related to a comparison of a topic associated with the top N images and the topic associated with the text, wherein the explanatory value of the top N images is above a threshold;
    providing an icon by text associated with the top N images to indicate that the top N images are available for the text, wherein a user interface displays the top N images to allow a user to select an image from the top N images from the user interface; and
    associating the image that is selected with the text based on a ranking.

9. The method of claim 8, wherein the selecting the set of top N images comprises applying the search query to a web based search engine.

10. The method of claim 8, further comprising filtering the set of images based on at least one of: a difficulty level, display characteristics, and permissions settings.

11. A machine-readable non-transitory storage medium comprising instructions executable by a processor to:
    generate a query based on a topic, wherein query comprises a question, wherein a set of images is found based on the query, wherein the set of images comprise text associated with a respective image that answers the question;

select a top N images from the set of images to associate with a text based on a criteria indicating an explanatory value of a context information related to the top N images in relation to the topic of the text, wherein the explanatory value of the top N images is above a threshold;

provide an icon by text associated with the top N images to indicate that the top N images are available for the text, wherein a user interface displays the top N images to allow a user to select an image from the top N images from the user interface; and output the image that is selected.

12. The machine-readable non-transitory storage medium of claim 11, wherein the instructions to select the top N images comprise instructions to select the top N images based on a comparison of a semantic topic associated with the text and a semantic topic associated with a document including the top N images.

13. The machine-readable non-transitory storage medium of claim 11, further comprising instructions to divide the text into portions based on divisions in the topic, wherein the top N images that is selected is selected for a portion of the text.

14. The machine-readable non-transitory storage medium of claim 12, wherein instructions to output the image comprise instructions to create a publication including the text and the image.

* * * * *